(12) United States Patent
Montgomery (10) Patent No.: US 9,493,331 B2
(45) Date of Patent: *Nov. 15, 2016

(54) LIFTING AND REMOVAL DEVICE (75) Inventor: Jeffery D. Montgomery, Pittsburgh, PA (US)

(73) Assignee: Jeffery D. Montgomery, Brentwood, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,241

(22) Filed: Jun. 13, 2012

(65) Prior Publication Data

US 2013/0147219 A1 Jun. 13, 2013

Related U.S. Application Data (60) Provisional application No. 61/496,534, filed on Jun. 13, 2011.

(51) Int. Cl.
*B66F 19/00* (2006.01)
*B65G 7/12* (2006.01)

(52) U.S. Cl.
CPC .............. *B66F 19/005* (2013.01); *B65G 7/12* (2013.01)

(58) Field of Classification Search
CPC ................................................... B66F 19/005
USPC ............ 294/16, 24, 26, 103.1, 119; 254/131
See application file for complete search history.

(56) References Cited

U.S. PATENT DOCUMENTS

| | | | |
|---|---|---|---|
| 1,527,939 A * | 2/1925 | Van Every | 294/116 |
| 1,933,384 A | 10/1933 | Moylan | |
| 2,086,318 A | 7/1937 | Jackson | |
| 2,348,978 A | 5/1944 | Kinner | |
| 2,655,399 A | 10/1953 | McMillan | |
| 2,829,917 A * | 4/1958 | Wiora | 294/90 |
| 2,832,628 A | 4/1958 | Turnbull | |
| 2,846,259 A | 8/1958 | Sadler | |
| 3,152,708 A | 10/1964 | Agesen | |
| 3,164,893 A | 1/1965 | Ashworth | |
| 3,198,362 A | 8/1965 | Berg | |
| 3,275,299 A | 9/1966 | Meshew | |
| 3,362,684 A | 1/1968 | Davenport | |
| 3,837,622 A | 9/1974 | Gale | |
| 3,861,649 A | 1/1975 | Mosley | |
| 3,957,247 A | 5/1976 | Haller | |
| 3,985,338 A | 10/1976 | Herrmann | |
| 4,076,217 A | 2/1978 | Haller | |
| 4,126,297 A | 11/1978 | Barnes | |
| 4,157,809 A | 6/1979 | Haller | |

(Continued)

*Primary Examiner* — Paul T Chin
(74) *Attorney, Agent, or Firm* — Bartony & Associates, LLC (57) ABSTRACT

A device for use in connection with a manhole covers having two generally opposing slots includes a first member including a first section and a second section including a first attachment member. The device further includes a second member including a second attachment member. The first member and the second member are rotatably connected so that a distance between the first attachment member and the second attachment member can be adjusted. The first section extends from the second section so that a proximal end thereof is at a height above the surface of the manhole cover of no greater than 3 feet when the first attachment member is in attachment with one of the two slots and the second attachment member is in attachment with the other of the two slots.

20 Claims, 4 Drawing Sheets

(56) References Cited

U.S. PATENT DOCUMENTS

| | | |
|---|---|---|
| 4,157,810 A | 6/1979 | Haller |
| 4,157,811 A | 6/1979 | Haller |
| 4,181,290 A | 1/1980 | Affolter |
| 4,227,731 A | 10/1980 | Castle |
| 4,321,003 A | 3/1982 | Castle |
| 4,365,925 A | 12/1982 | Girtz |
| 4,482,182 A | 11/1984 | Mortensen |
| 4,488,706 A | 12/1984 | Kono |
| 4,512,554 A | 4/1985 | Racine |
| 4,572,566 A | 2/1986 | Terrington |
| 4,650,232 A | 3/1987 | Perry |
| 4,662,607 A | 5/1987 | Mochizuki |
| 4,746,098 A | 5/1988 | Abarotin |
| 4,826,388 A | 5/1989 | Golding |
| 4,838,521 A * | 6/1989 | Moisan ............ 254/131 |
| 4,991,893 A | 2/1991 | Gordon |
| 5,004,282 A | 4/1991 | Perry |
| 5,070,564 A * | 12/1991 | Fey ............ 294/16 |
| 5,165,661 A | 11/1992 | Wright |
| 5,382,131 A | 1/1995 | Werthmann |
| 5,462,385 A | 10/1995 | Mohlengraft |
| 5,713,559 A | 2/1998 | McClarin |
| 5,775,674 A | 7/1998 | Bigham |
| 6,176,469 B1 | 1/2001 | Bigham |
| 6,202,985 B1 | 3/2001 | Chong |
| 6,276,732 B1 | 8/2001 | Hauss |
| 6,325,432 B1 | 12/2001 | Sensat |
| 6,431,523 B2 | 8/2002 | Goldman |
| 6,439,628 B1 | 8/2002 | Eslambolchi |
| 6,520,482 B1 * | 2/2003 | Bigham ............ 254/131 |
| 6,595,566 B1 | 7/2003 | Donnan |
| 6,676,111 B2 * | 1/2004 | Bigham ............ 254/131 |
| 6,964,407 B1 * | 11/2005 | Butler ............ 254/131 |
| 7,278,671 B1 | 10/2007 | Herford |
| 7,503,743 B1 | 3/2009 | Friedrich |
| 7,544,035 B1 | 6/2009 | Friedrich |
| 2002/0179891 A1 | 12/2002 | Schuller |
| 2004/0135389 A1 | 7/2004 | Helms |
| 2007/0228346 A1 | 10/2007 | Beach |
| 2007/0246958 A1 | 10/2007 | Herford |

* cited by examiner

PRIOR ART

Fig. 4D (note: 4D appears at right of 4C area)

LIFTING AND REMOVAL DEVICE

CROSS-REFERENCE TO RELATED APPLICATIONS

This application claims benefit of U.S. Provisional Patent Application No. 61/496,534, filed Jun. 13, 2011, the disclosure of which is incorporated herein by reference.

BACKGROUND OF THE INVENTION

The following information is provided to assist the reader to understand the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein are incorporated by reference.

In a number of embodiments, devices or tools hereof are designed for use in removal various object including, for example, manhole covers. Recently, a newer style manhole covers have been replacing the older style of manhole covers at a fairly rapid pace. Unlike older manhole covers, which include "pick" holes inward from the perimeter thereof and passing therethrough in which a pick or hook can be inserted for removal, the newer manhole covers 10 (see FIGS. 1A and 1B) include a pair of opposing depressions or slots 12 about the perimeter or edge thereof. Each slot 12 defines an inner edge or flange 14. Slots 12 are built into cover 10, and not through it. Slots 12 are intended to minimize water infiltration through cover 10. As illustrated in FIG. 1B, manhole cover 10 rests upon a flange 16 which defines an opening 18. Opening 18 had a diameter less than that of manhole cover 10, an prevents manhole cover 10 from falling though opening 18 during lifting and/or removal.

Traditional manhole cover removal methods do not work with manhole covers 10. Workers often find manhole covers 10 difficult to remove. Moreover, removal often requires two workers. A number of devices have been designed to facilitate the removal of various manhole covers, including manhole covers 10. However, many such devices are difficult to use, do not operate well, are overly complex and/or suffer from other deficiencies.

SUMMARY OF THE INVENTION

In one aspect, a device for use in connection with a manhole covers having two generally opposing slots, includes a first member including a first section, a second section and a first attachment member on a distal end of the second section. The first attachment member is adapted to form an attachment with one of the two slots. The device further includes a second member including a second attachment member on a distal end thereof. The second attachment member of the second member is adapted to form an attachment with the other of the two slots. The first member and the second member are rotatably connected so that a distance between the first attachment member of the first member and the second attachment member of the second member can be adjusted. The device may further include a handle attached to a proximal end of the first section of the first member.

In a number of embodiments, the first section of the first member extends from the second section so that a proximal end of the first section is at a height above the surface of the manhole cover of no greater than 3 feet, no greater than 2.5 feet, no greater than 2 feet, no greater than 18 inches, or even no greater than 12 inches when the first attachment member is in attachment with one of the two slots and the second attachment member is in attachment with the other of the two slots.

In a number of embodiments, the device further includes a biasing member to bias rotation of the first member relative to the second member in a manner to draw the first attachment member of the first member and the second attachment member of the second member toward each other. The biasing member may, for example, include a spring attached at a first end thereof to the first member and attached at a second end thereof to the second member.

In a number of embodiments, the second member includes a first section and a second section. The second attachment member is attached to a distal end of the second section of the second member. The first section of the second member extends from the second section of the second member so that a proximal end of the first section of the second member is at a height above the surface of the manhole cover of no greater than 3 feet, no greater than 2.5 feet, no greater than 2 feet, no greater than 18 inches, or even no greater than 12 inches when the first attachment member is in attachment with one of the two slots and the second attachment member is in attachment with the other of the two slots. The device may further include a handle attached to a proximal end of the first section of the first member and a handle attached to a proximal end of the first section of the second member.

In another aspect, a method of removing a manhole covers includes using a device hereof to remove the manhole cover.

In a further aspect, a device for use in connection with an object, includes a first member which includes a first section, a second section and a first attachment member on a distal end of the second section. The first attachment member is adapted to form an attachment with one side of the object. The device further includes a second member including a second attachment member on a distal end thereof. The second attachment member of the second member being adapted to form an attachment with another side of the object. The first member and the second member are rotatably connected so that a distance between the first attachment member of the first member and the second attachment member of the second member can be adjusted.

The first section of the first member extends from the second section so that a proximal end of the first section is at a height above the surface of the object of no greater than 3 feet, no greater than 2.5 feet, no greater than 2 feet, not greater than 18 inches, or even no greater than 12 inches when the first attachment member is in attachment with the object and the second attachment member is in attachment with the object.

The present invention, along with the attributes and attendant advantages thereof, will best be appreciated and understood in view of the following detailed description taken in conjunction with the accompanying drawings.

BRIEF DESCRIPTION OF THE DRAWINGS

FIG. 5C illustrates another perspective view of the use of the device of FIG. 3 to remove the manhole cover from its seating.

DETAILED DESCRIPTION OF THE INVENTION

As used herein and in the appended claims, the singular forms "a," "an", and "the" include plural references unless the content clearly dictates otherwise. Thus, for example, reference to "an attachment mechanism" includes a plurality of such attachment mechanisms and equivalents thereof known to those skilled in the art, and so forth, and reference to "the attachment mechanism" is a reference to one or more such attachment mechanisms and equivalents thereof known to those skilled in the art, and so forth.

Figure 1A:
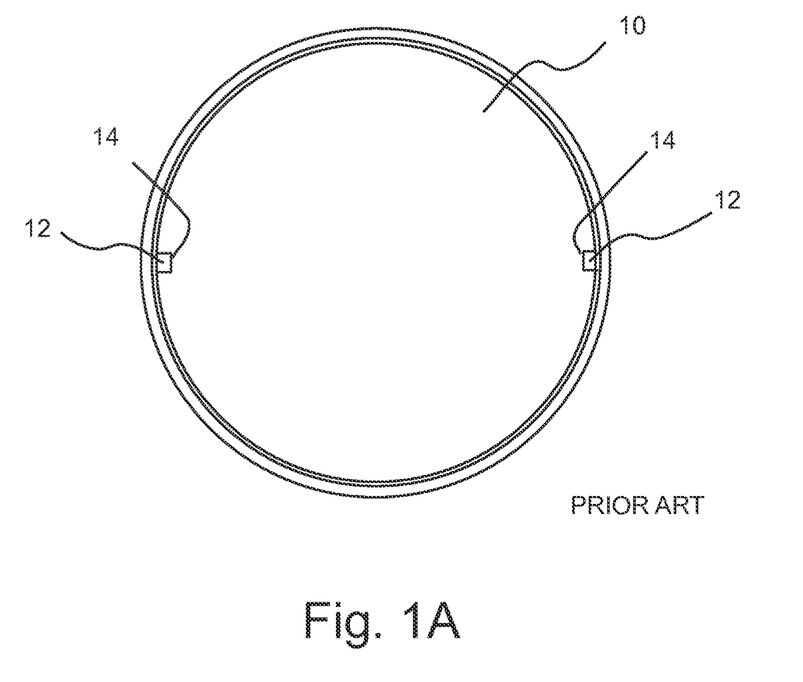
FIG. 1A illustrates a top plan view of a manhole cover in place within its seating.
Figure 1B:
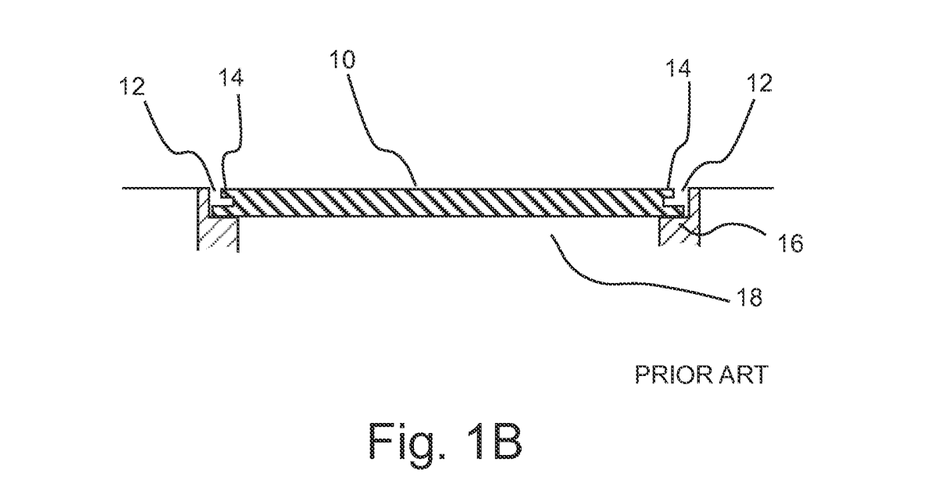
FIG. 1B illustrates a side cross-sectional view of the manhole cover in place within its seating.
Figure 2A:
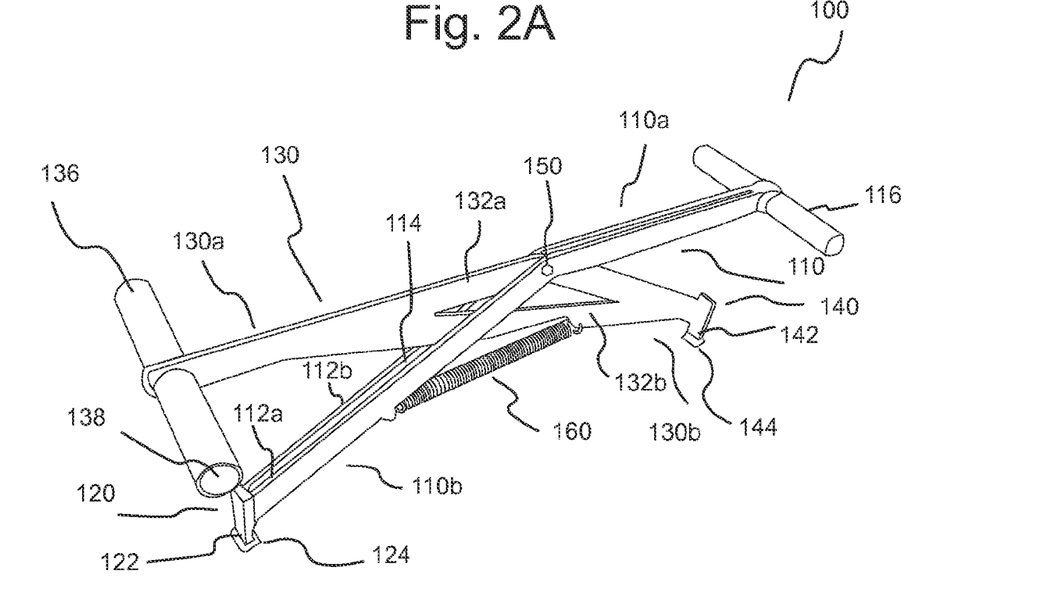
FIG. 2A illustrates a perspective view of an embodiment of a device hereof including two handles for use by one or two people.

FIG. 2A illustrates an embodiment of a device 100 to address lifting, removal and/or replacement problems associated with a number of objects, including manhole covers 10 as illustrated, for example, in FIGS. 1A and 1B. Device 100 includes a first member 110 and a second member 130 which is pivotably or rotatably attached to first member 110 via, for example, a connector 150 such as a bolt. In the illustrated representative embodiment, first member 110 is formed as a frame including a first extending side member 112a and a second extending side member 112b spaced from the first side member 112a to define a space 114 therebetween. Second member 130 extends through space 114. Connector 150 passes through aligned passages (not shown) formed in each of second member 130 and side members 112a and 112b of first member 110 to pivotably connect second member 130 to first member 110.

In a number of embodiments, a first, upper or proximal section 110a of first member 110 includes a handle 116 attached to a proximal end thereof. In the illustrated embodiment, handle 116 extends laterally from side members 112a and 112b to, for example, be grasped by each hand of a user on each side thereof. In a number of embodiments, side members 112a and 112b extend from handle 116 and angle, curve or bend downward, for example, in the vicinity of connector 150 to form a second, lower or distal section 110b. An attachment mechanism 120 is attached to the distal end of second section 110b (that is, to side members 112a and 112b of second section 110b) of first member 110. In the illustrated embodiment, attachment mechanism 120 includes a generally downward extending portion 122 and a generally horizontally extending portion 124 which together form a "hook" which is adapted to enter one of slots 12 and cooperate with edge 14 to connect manhole cover 10 to device 100. As clear to one skilled in the art, other configurations of attachment mechanism 120 can be used to cooperate with various types of slots or other connection mechanisms on manhole covers and other items. Sections 110a and 110b of first member 110 can, for example, be formed from different sections of material (for example, a metal) which are rigidly attached (for example, welded). Alternatively, can sections 110a and 110b of first member 110 can be formed from monolithic lengths of a material.

A first, upper or proximal section 130a of second member 130 includes a handle 136 on an end thereof. In the illustrated embodiment, handle 136 extends laterally from second member on each side thereof to, for example, be grasped by each hand of a user on each side thereof. Each of both of handle 116 or handle 136 can alternatively be grasped by one or more hands of multiple users. Handle 136 (and or handle 116), can, for example, be hollow and include one or more caps 138 to allow access to an inner volume thereof to enable storage of tools (for example, manhole a manhole cover cleaning tool etc.) and/or other items. An attachment mechanism 140 is attached to a second, lower or distal section 130b of second member 130. In the illustrated embodiment, a first extending member 132a of second member 130 extends from handle 136 and angles, curves or bends downward, for example, in the vicinity of connector 150. An attachment mechanism 140 is attached to a second, lower or distal end of first member 132a of second member 130. Similar to attachment mechanism 120, attachment mechanism 140 includes a downward extending portion 142 and a horizontally extending portion 144 which together form a "hook" which is adapted to enter the other of slots 12 and cooperate with edge 14 thereof to connect manhole cover 10 to device 100. As clear to one skilled in the art, other configurations of attachment mechanism 140 can be used to cooperate with various types of slots or other connection mechanisms on manhole covers and other items. Sections 130a and 130b of second member 130 can, for example, be formed from different sections of material (for example, a metal) which are rigidly attached (for example, welded). Alternatively, sections 130a and 130b of second member 130 may be formed from monolithic lengths of a material.

In the illustrated embodiment, second member 130 also includes an extending member 132b which extends from a first point on extending member 132a on the handle side of connector 150 to a second point on extending member 132a on the attachment mechanism side of connector 150, thereby forming a triangular configuration. Extending member 132b can, for example, assist in increasing the strength of second member 130.

First member 110 and second member 130 can, for example, be biased relative to each other so that attachment members 120 and 140 are biased to be drawn toward each other or radially inward with respect to manhole cover 10 (that is, biased such that the distance between attachment members 120 and 140 is biased to decrease). In the illustrated embodiment, a biasing member such as a coil tension spring 160 is connected at one end thereof to first member 110 at a point below connector 150 (that is to section 110b) and is connected at a second end thereof to second member 130 at a point below connector 130 (that is, to section 130b). The tension applied by spring 160 biases first member 120 and second member 140 to rotate relative to each other about connector 150 so that attachment members 120 and 140 are drawn toward each other or the distance between attachment members 120 and 140 is decreased.

Device 100 facilitates attaching to or locking onto, for example, manhole covers of the type of manhole cover 10, and allows one or two people to safely and easily lift, remove (transport) and then replace cover 10. To attach device 100 to manhole cover 10, one should first ensure that both slots 12 are free of debris. One then places device 100 on top of cover 10 with one of attachment mechanisms or hooks 120 and 140 securely in one slot 12 and the other of attachment mechanisms or hooks 120 and 140 oriented toward opposite slot 12. Next, gentle downward pressure is applied to one or both of handles 116 and 136. The applied pressure causes attachment mechanisms or hooks 120 and 140 to spread or move radially apart until the second attachment mechanisms or hooks 120 and 140 seats securely in opposite slot 12. Device 10 is now attached to manhole cover 10 and is locked into position. Device 10 will not release until a reverse procedure is carried. Spring 160 adjusts readily to different diameter covers and automatically holds device 10 securely in position during the procedures of removal and replacement. Providing two handles on device 100 allows these procedures to be accomplished by one or two people depending on the situation. As long as tension is maintained by spring 160, or by lifting upward on either (or both) handles, tool 10 will not release manhole cover 10 (thereby facilitating transport of manhole cover 10). As, for example, illustrated in FIGS. 4C and 4D, device 100 remains in operative connection with manhole cover 10.

In a representative embodiment, device 100 was approximately 31 inches long and approximately 10 inches tall when attachment mechanisms 120 and 140 were in a fully extended (widest) position. In that embodiment, device 100 weighed approximately 13 lbs. Such a height and length provide a person of average size sufficient leverage, while maintaining a desirable lifting position, when device 100 is attached to a manhole cover 10 at ground level. In that representative embodiment, 1¼"×¼" steel flat bar, welded together, was used throughout device 100.

Figure 2B:
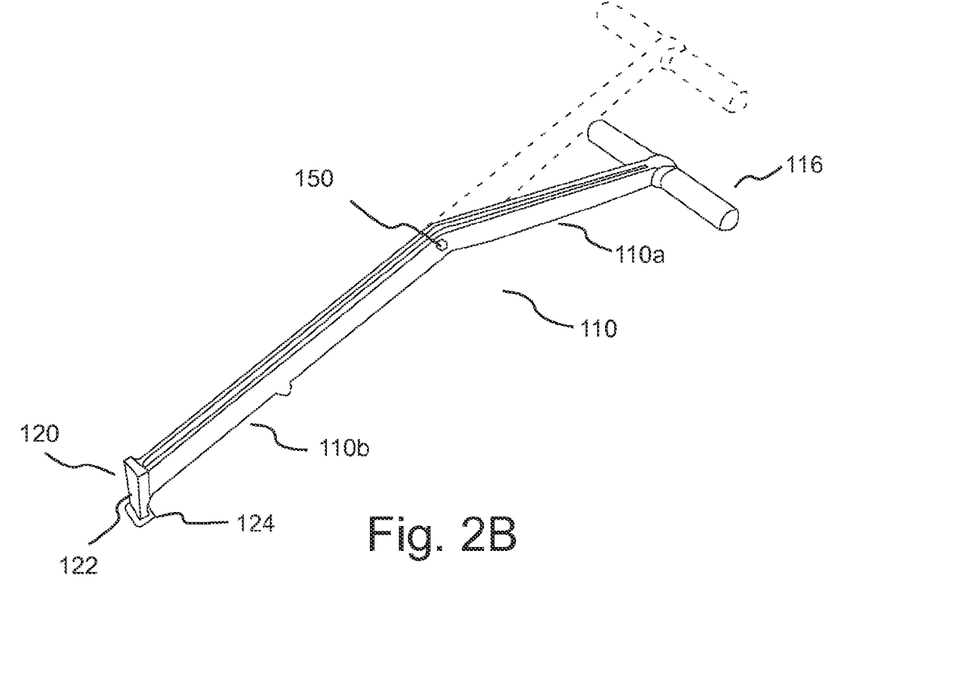
FIG. 2B illustrates a perspective view of one member of the device of FIG. 2A wherein the change in the height of the handle for the case that the member was formed in a straight line is illustrated in broken lines.

Angling (or curving) of section 110a with respect to section 110b, and angling (or curving) section 130a with respect to section 130b (for example, forming an obtuse angle therebetween) results in handles 116 and 136, respectively, being lower than if first member 110 and second member 130 extended in a generally straight line or generally linearly (that is, forming an angle of approximately 180°). For example, FIG. 2B illustrates an embodiment, in dashed lines, of first member 110 wherein section 110a and section 110b extend in a generally straight line. As illustrated in FIG. 2B, the height of handle 116, when first section 110a and second section 110b of first member 110 extend in a generally straight line, is higher than if first section 110a and second section 110b form an angle. Downward force on one or both of handles 116 and 136 tends to cause spreading of the distance between attachment mechanisms 120 and 140 and removal of attachment of device 100 from connection with manhole cover 10. To prevent attachment mechanisms 120 from separating and disconnecting from manhole cover 10, it is desirable that an upward force be maintained on handle 116 and/or handle 136 as manhole cover 10 is being removed from it seating/opening 18. If handle 116 and/or handle 136 extend to a certain height (for example, above the waist of a user), the likelihood that a downward force will be exerted on the handle by the user during removal of manhole cover 10 greatly increases. In a number of embodiments, the proximal ends of first member 110 and second member 130 (and handles 116 and 136, respectively) extend to a height no greater than 3 feet, no greater than 2.5 feet, no greater than 2 feet, no greater than 18 inches. or even no greater than 12 inches when device 100 is connected to manhole cover 10. In general, handle 116 and/or handle 136 may be maintained, for example, below the waist of a user even in the case that first member 110 and second member 130 extend in a generally straight line (as, for example, illustrated in dashed lines for first member 110 in FIG. 2B). In one such embodiment, the proximal ends of first member 110 and second member 130 (and handles 116 and 136, respectively) extend to a height no greater than 2.5 feet or 30 inches.

Figure 3:
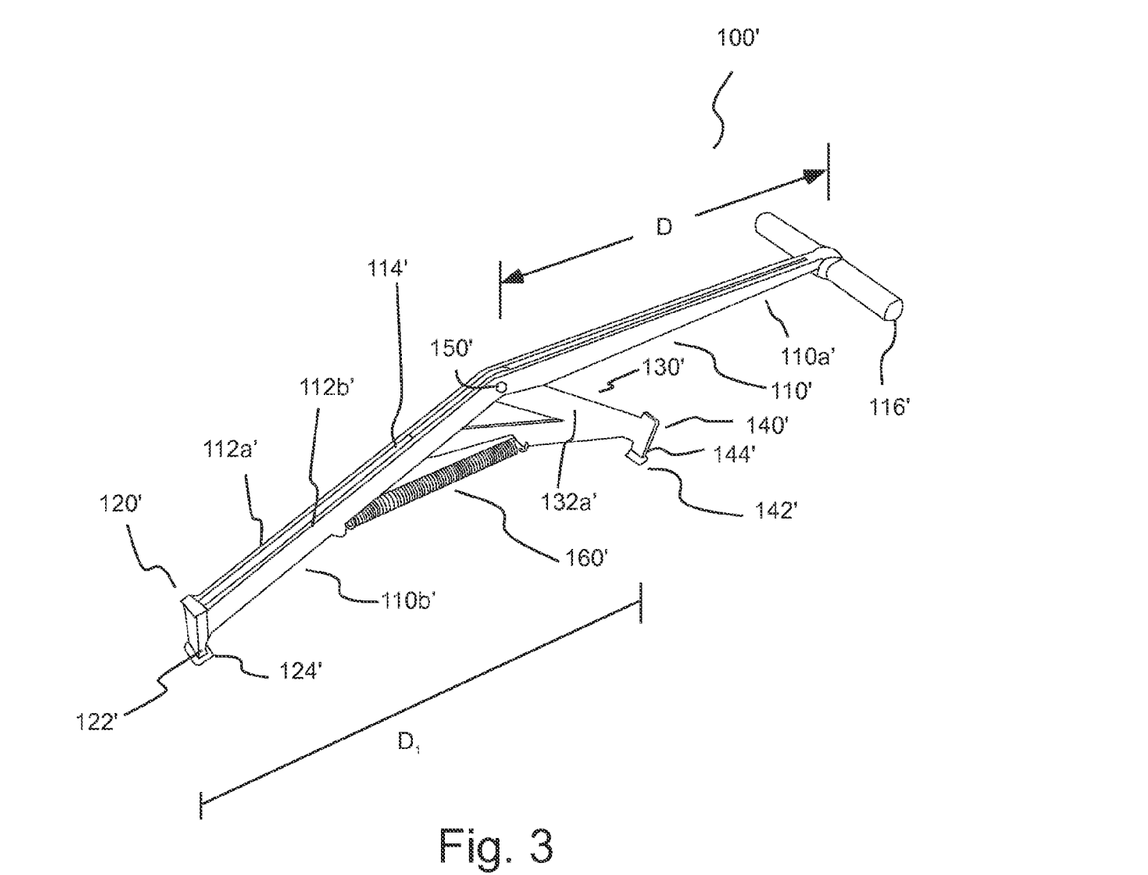
FIG. 3 illustrates a perspective view of another embodiment of a device hereof including a single handle.

An alternative, single-handled, embodiment of a device 100' hereof is illustrated in FIG. 3. In general, device 100' operates in a similar manner to device 100 and like components of device 100' are numbered similarly to corresponding components of device 100 with the addition of the designation "'" thereto. Device 100' differs from device 100 in that second member 130' is shortened and does not include an upper or proximal section or a handle. Further, the upper or proximal sections of extending side members 112a' and 112b' (above or on the handle side of connector 150') are extended to a length D (the distance from connector 150' to handle 116') provide increased leverage for a single user. Increasing the distance D in a two-handled embodiment such as device 100 will also increase leverage for each user or for a single user of such an embodiment. Providing for greater leverage by increasing distance D also assists in maintaining the height of the proximal ends of first member 110' at a relatively low height as described above in connection with first member 110.

As with first member 110 of device 100, first member 110' includes a first or upper section 110a' which extends at an angle (or a curve) to a second or lower section 110b'. In a number of embodiments, first section 110a' is angled or bent with respect to second section 110b' so that a proximal end of first section 110a' (and thus handle 116') is lower than would be the case if second section 110a' extended in line with second section 110b' to the same distance. However, first section 110a' and second section 110b' (or first member 110') may extend in a generally straight line. In a number of embodiments, the proximal end of first member 110' and handles 116' attached thereto extend to a height no greater than 3 feet, no greater than 2.5 feet, no greater than 2 feet, no greater than 18 inches. or even no greater than 12 inches when device 100' is connected to manhole cover 10. Such positioning of the proximal end of first section 110a' as described above, enables a user to lift upward on handle 116' to lift manhole cover 10 out of its seating and then to pull rearward (with respect to the direction the user is facing) to remove manhole cover 10 from opening 18 without exerting a downward force on handle 116' and first member 110'. As discussed above, such a downward force causes spreading of the distance between attachment mechanisms or hooks 120' and 140' and removal of device 100' from connection with manhole cover 10.

Figure 4A:
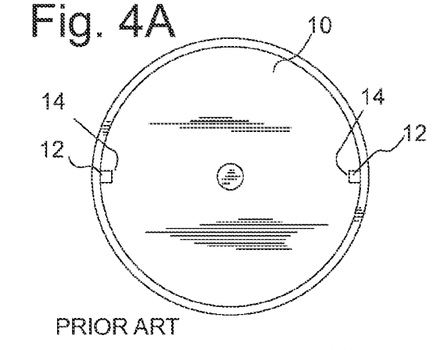
FIG. 4A illustrates a perspective view of a manhole cover in place within its seating.
Figure 4B:
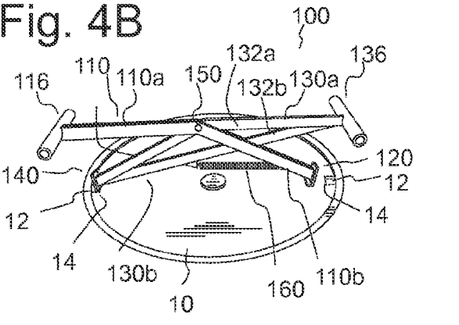
FIG. 4B illustrates a perspective view of the device of FIG. 2 in partial connection with the manhole cover.
Figure 4C:
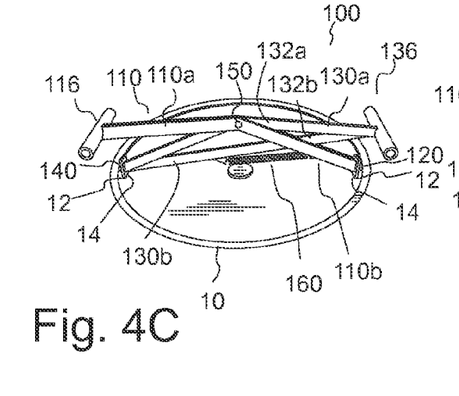
FIG. 4C illustrates a perspective view of the device of FIG. 2 fully connected to the manhole cover.
Figure 4D:
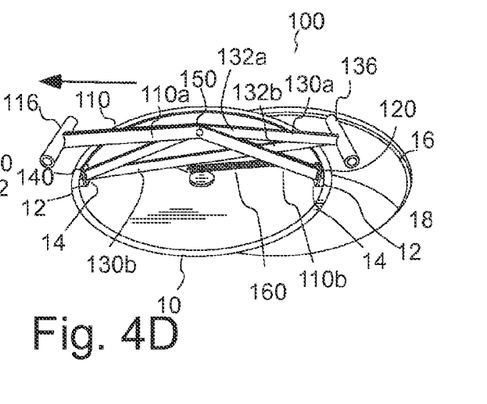
FIG. 4D illustrates a perspective view of the use of the device of FIG. 2 to remove the manhole cover from its seating.
Figure 5A:
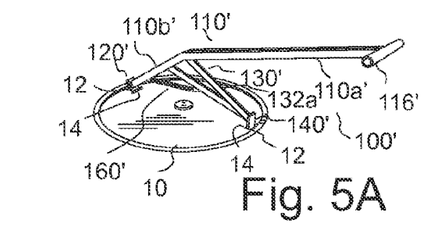
FIG. 5A illustrates a perspective view of the device of FIG. 3 in partial connection with the manhole cover.
Figure 5B:
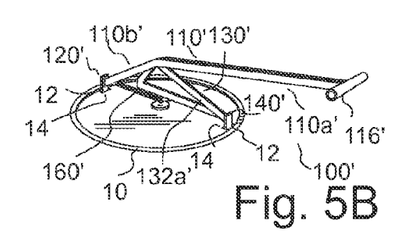
FIG. 5B illustrates a perspective view of the device of FIG. 3 fully connected to the manhole cover.
Figure 5C:
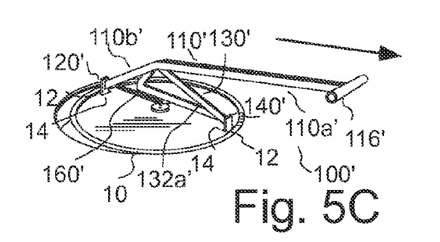
FIG. 5C illustrates a perspective view of the use of the device of FIG. 3 to remove the manhole cover from its seating.
Figure 5D:
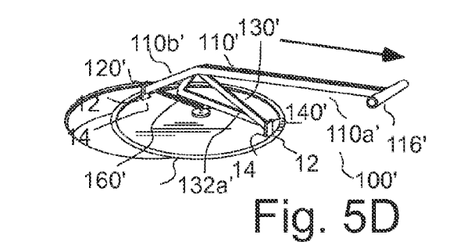

The use of device 100 to remove a manhole cover 10 is illustrated in FIGS. 4B through 4D. The use of device 100' to remove a manhole cover 10 is illustrated in FIGS. 5A through 5D.

Mechanisms other biasing spring 160 can used to maintain device 100' and other devices hereof in operative connection with manhole cover 10. For example, the angle of second member 130' relative to first member 110' can be manually adjustable and a locking mechanism (not shown) can included to maintain the selected angle. Alternatively or additionally, the position of one or both of attachment mechanisms or hooks 120' and 140' on first member 110' and second member 130' can be made to be adjustable. In a number of embodiments of devices hereof, a distance $D_1$ between attachment mechanisms or hooks hereof was adjustable between, for example, 24 inches and 28 inches to readily accommodate common manhole cover sizes. However, distance $D_1$ is readily altered to accommodate many differently sized objects. The distance D in a number of embodiments was at least equal to one-half of $D_1$, at least equal to $D_1$, at least equal to 1.5 $D_1$ or even at least equal to 2.0 $D_1$. The height to which handle 116' extends may, for example, be adjusted for a particular distance $D_1$ via, for example, the length of first member 110' (the lengths of first section 110a' and second section 110b'), the position of connector 150' along first member 110', and the length and/or angle of second member 130'.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A device for use in connection with a manhole cover having two generally opposing slots, comprising:

a first member comprising a first extending side member and a second extending side member spaced from the first extending member, the first member having a first section and a second section, the first member further comprising a first attachment member on a distal end of the second section and a handle on a proximal end of the first section, the handle extending at an angle from the first section, the first attachment member being adapted to form an attachment with one of the two slots;

a second member comprising a second attachment member on a distal end thereof, the second attachment member of the second member being adapted to form an attachment with the other of the two slots, a proximal end of the second member being rotatably connected to the first member between the first extending side member and the second extending side member in the vicinity of the juncture between the first section and the second section of the first member so that a distance between the first attachment member of the first member and the second attachment member of the second member can be adjusted; and a biasing member to bias rotation of the first member relative to the second member in a manner to draw the first attachment member of the first member and the second attachment member of the second member toward each other;

the first section of the first member extending from the second section of the first member at least a distance that is one half the distance between the first attachment member and the second attachment member when the first attachment member is in attachment with one of the two slots and the second attachment member is in attachment with the other of the two slots so that the end of the first section extends outside a perimeter of the manhole cover and the handle is at a height above the surface of the manhole cover of no greater than 2 feet; wherein the manhole cover is removable from its seating by a single user via upward force applied to the handle to tilt a side of the manhole cover closest to the user upward and application of a pulling force to the handle to drag the manhole cover rearward.

2. The device of claim 1 wherein the first section of the first member extends from the second section so that the handle is at a height above the surface of the manhole cover of no greater than 12 inches when the first attachment member is in attachment with one of the two slots and the second attachment member is in attachment with the other of the two slots.

3. The device of claim 1 wherein the first section of the first member extends from the second section so that the handle is at a height above the surface of the manhole cover of no greater than 18 inches when the first attachment member is in attachment with one of the two slots and the second attachment member is in attachment with the other of the two slots.

4. The device of claim 3 wherein the first section of the first member and the second section of the first member extend generally linearly.

5. The device of claim 1 wherein the biasing member comprises a spring attached at a first end thereof to the first member and attached at a second end thereof to the second member, the spring being adapted to maintain the device in connection with the manhole cover after the device is attached to the manhole cover via the first attachment member and the second attachment member absent user intervention including application of downward force to the handle.

6. The device of claim 5 wherein the first section of the first member extends from the second section of the first member at least a distance that is equal to the distance between the first attachment member and the second attachment member when the first attachment member is in attachment with one of the two slots and the second attachment member is in attachment with the other of the two slots.

7. The device of claim 1 wherein upward force on the handle operates to apply a force to draw the first attachment member toward the second attachment member.

8. The device of claim 1 wherein the handle attached to the proximal end of the first section of the first member extends generally perpendicular to the first section.

9. The device of claim 1 wherein the first section of the first member and the second section of the first member extend generally linearly.

10. The device of claim 1 wherein the handle extends approximately perpendicularly from the first section of the first member.

11. A device for use in connection with a manhole cover having two generally opposing slots, comprising:

a first member comprising a first extending side member and a second extending side member spaced from the first extending member, the first member having a first section and a second section, a first attachment member on a distal end of the second section, and a handle on a proximal end of the first section, the handle extending at an angle from the first section; the first attachment member being adapted to form an attachment with one of the two slots;

a second member comprising a second attachment member on a distal end thereof, the second attachment member of the second member being adapted to form an attachment with the other of the two slots, the second member being rotatably connected to the first member between the first extending side member and the second side extending member in the vicinity of the juncture between the first section and the second section of the first member so that a distance between the first attachment member of the first member and the second attachment member of the second member can be adjusted, the first section of the first member extending from the second section of the first member at least a distance that is one half the distance between the first attachment member and the second attachment member when the first attachment member is in attachment with one of the two slots and the second attachment member is in attachment with the other of the two slots; and a biasing member to bias rotation of the first member relative to the second member in a manner to draw the first attachment member of the first member and the second attachment member of the second member toward each other, wherein the manhole cover is removable from its seating by a single user via upward force applied to the handle to tilt a side of the manhole cover closest the user upward and application of a pulling force to the handle to drag the manhole cover rearward.

12. The device of claim 11 wherein the biasing member comprises a spring attached at a first end thereof to the first member and attached at a second end thereof to the second member, the spring being adapted to maintain the device in connection with the manhole cover after the device is attached to the manhole cover via the first attachment member and the second attachment member absent user intervention including application of downward force to the handle.

13. The device of claim 12 wherein the first section of the first member extends from the second section so that a proximal end of the first section is at a height above the surface of the manhole cover of no greater than 2 feet when the first attachment member is in attachment with one of the two slots and the second attachment member is in attachment with the other of the two slots.

14. The device of claim 12 wherein the first section of the first member extends from the second section so that a proximal end of the first section is at a height above the surface of the manhole cover of no greater than 18 inches when the first attachment member is in attachment with one of the two slots and the second attachment member is in attachment with the other of the two slots.

15. The device of claim 12 wherein the first section of the first member and the second section of the first member extend generally linearly.

16. The device of claim 12 wherein the first section of the first member extends from the second section so that a proximal end of the first section is at a height above the surface of the manhole cover of no greater than 18 inches when the first attachment member is in attachment with one of the two slots and the second attachment member is in attachment with the other of the two slots.

17. The device of claim 11 wherein the handle extends approximately perpendicularly from the first section of the first member.

18. The device of claim 17 wherein the first section of the first member extends from the second section of the first member at least a distance that is one half the distance between the first attachment member and the second attachment member when the first attachment member is in attachment with one of the two slots and the second attachment member is in attachment with the other of the two slots so that the handle extends outside a perimeter of the manhole cover.

19. The device of claim 18 wherein upward force on the handle operates to apply a force to draw the first attachment member toward the second attachment member.

20. The device of claim 11 wherein the first section of the first member and the second section of the first member extend generally linearly.

* * * * *